Figure 1:
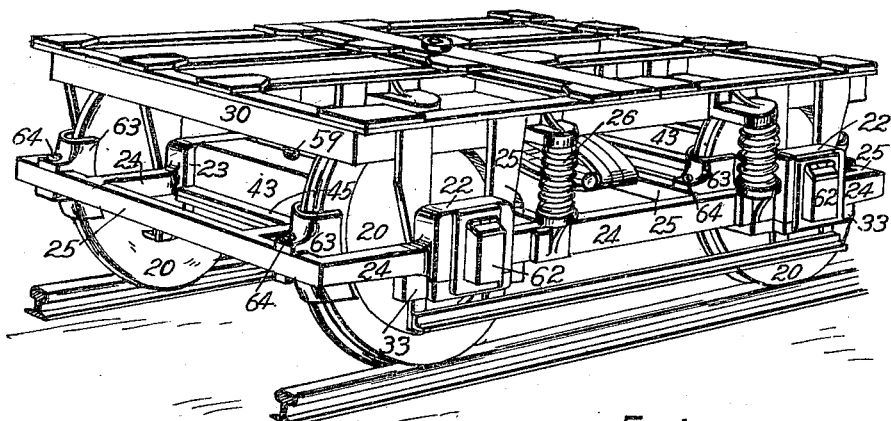

A. R. ANGUS.
RUNNING GEAR OF RAILWAY CARS.
APPLICATION FILED DEC. 23, 1908.

964,479.

Patented July 19, 1910.
4 SHEETS—SHEET 1.

Witnesses
W. P. Burke.
Chas. G. Smith.

Inventor
Arthur R Angus

Attorney

A. R. ANGUS.
RUNNING GEAR OF RAILWAY CARS.
APPLICATION FILED DEC. 23, 1908.

964,479.

Patented July 19, 1910.
4 SHEETS—SHEET 4.

Witnesses
W. P. Burke
Chas. G. Smith

Inventor
Arthur R. Angus
Attorney

UNITED STATES PATENT OFFICE.

ARTHUR REGINALD ANGUS, OF NEUTRAL BAY, NEW SOUTH WALES, AUSTRALIA.

RUNNING-GEAR OF RAILWAY-CARS.

964,479. Specification of Letters Patent. Patented July 19, 1910.

Application filed December 23, 1908. Serial No. 469,002.

*To all whom it may concern:*

Be it known that I, ARTHUR REGINALD ANGUS, a subject of the King of Great Britain, residing at Barry street, Neutral Bay, in the State of New South Wales and Commonwealth of Australia, solicitor, have invented new and useful Improvements in the Running-Gear of Railway-Cars, of which the following is a specification.

This invention distinguished from other somewhat similar inventions of the same inventor by the letter "M" refers to the running gear of railway cars, carriages, wagons, trucks and the like vehicles or rolling stock (herein referred to severally and collectively as "cars" or "railway cars") and relates to devices to enable or permit each wheel of a pair of wheels to rotate independently of the other so that each can accommodate its rate of rotation to the distance over which it has to travel while preserving a continuous "axial line." The principles of such device are first a divided axle or semi-axle for each wheel within independent bearings one on each side of each wheel and disposed so that each pair of semi-axles is prevented from departing up or down from the straight line or practically so formed by each pair of semi-axles under conditions hereinafter mentioned which straight line or practically so I term the axial line. And secondly a rigid connector or frame for holding or maintaining the bearings of two corresponding semi-axles of a "car" in their proper positions relatively one to the other and preventing the semi-axles within their bearings from being thrown out of their axial line. And this invention has been specially devised to provide a series of what I term "factors of safety" for retaining the "axial line" of each pair of semi-axles while allowing what may be termed "radial action" of the wheels of the "car" and at the same time preserving the gage of each pair of wheels. The term "divided axle" used in connection with these improvements means or is synonymous with the term "a pair of semi-axles" also with the term "two corresponding semi-axles". Each divided axle has therefore two parts. Each part of a divided axle—though independent of the other part thereof so far as rotation is concerned—is assumed to be in a straight line with the other or practically so that is to say, in axial line or alined position.

By radial action I mean that each wheel of the car is permitted by the arrangement of its "bearings" and "keeps box bearings" as herein indicated to traverse or pass around when running on the rails at curves a small arc of a circle till restrained by said "bearings" and "keeps box bearings" and the action of the flanges of the wheels in contact with the rails from further effecting what I term "radial action" which corresponds with a swinging movement of the wheels and divided axles. The amount of "radial action" to be permitted may be determined by *inter alia*, the maximum degree of curvature of rails required to be traversed by a "railway car" when running on any railway journey. By "bearings" I mean the brasses, gun-metal or other material in which the semi-axles rotate in close contact therewith which "bearings" preferably completely encircle or surround the semi-axles. A characteristic feature of such bearings being that the said bearings are capable of effecting a small or slight movement together with the semi-axles within their bearing blocks (as hereinafter mentioned) in a horizontal plane so as to permit the wheels of the car to effect radial action as hereinbefore mentioned while at the same time the bearings seek to restrain movement of the semi-axles up or down a vertical plane from the axial line. It is an essential feature of the "bearings" that there should be an upper and a lower part of the "bearings" each upper and lower part of the "bearings" being preferably made in equal pieces or parts. The use of the term "bearings" herein includes an upper and lower part thereof. By "bearing blocks" I mean the "blocks" in close contact with the "bearings" and which blocks completely encircle or surround and hold the "bearings" and which "blocks" have an upper and a lower piece or part which said lower piece or part is hereinafter referred to as the "bridge piece". But in order to explain how this present invention is carried into practical operation these present improvements are illustrated in the drawings accompanying and forming part of this complete specification and the same and the working thereof will now be described with references to such drawings.

Figure 2:
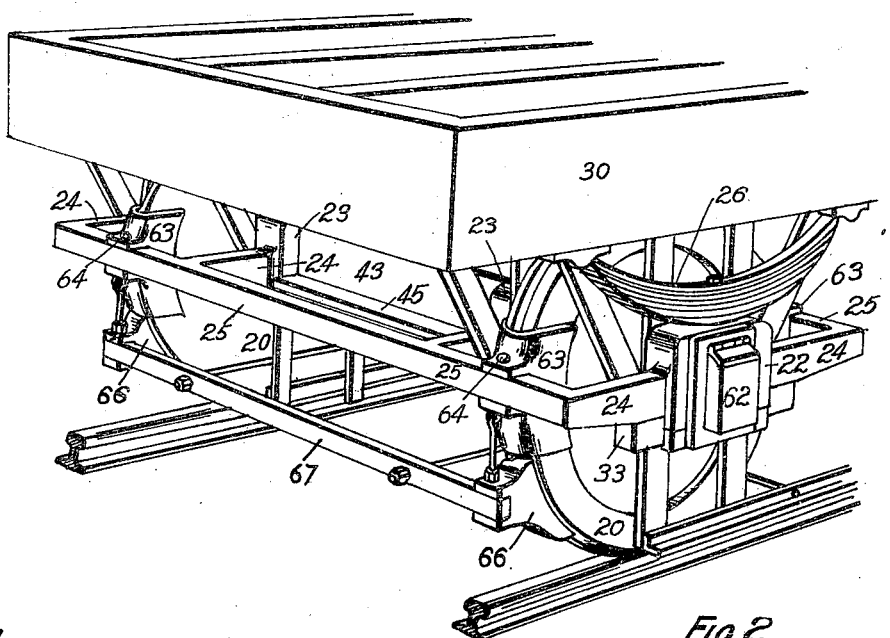
Figure 3:
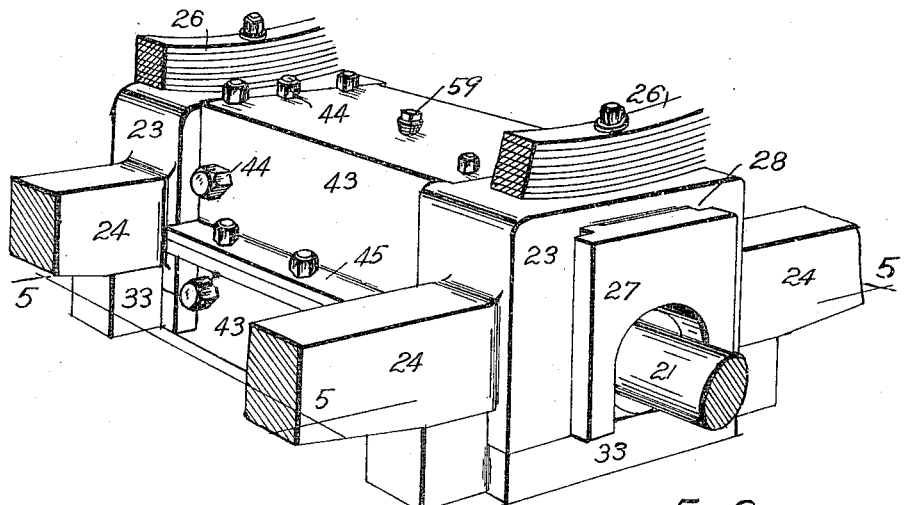
Figure 4:
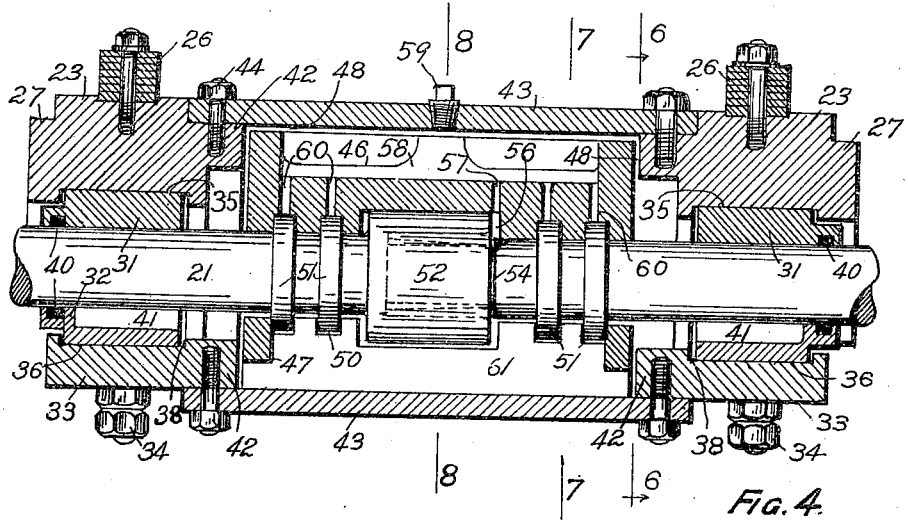
Figure 5:
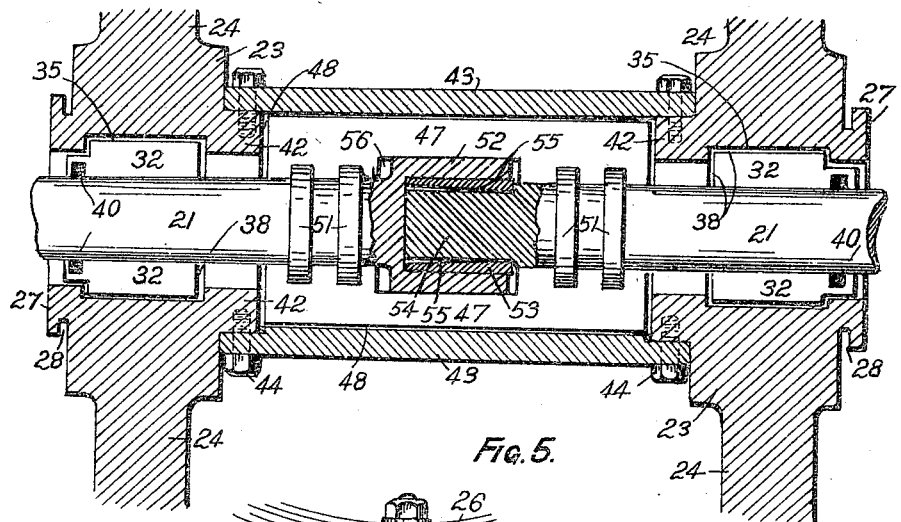
Figure 6:
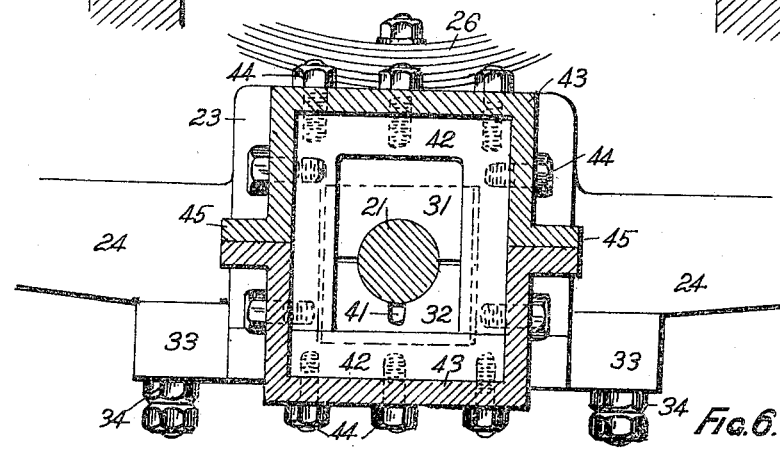
Figure 7:
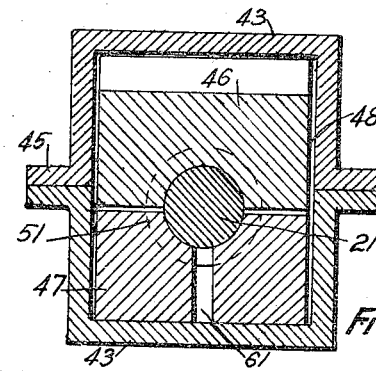
Figure 8:
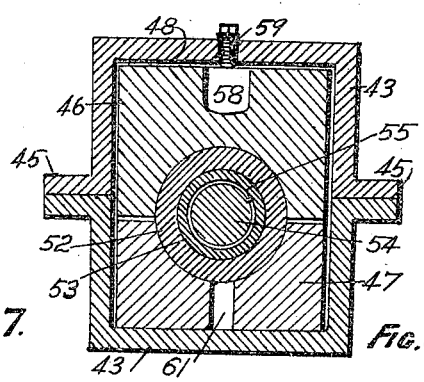
Figure 9:
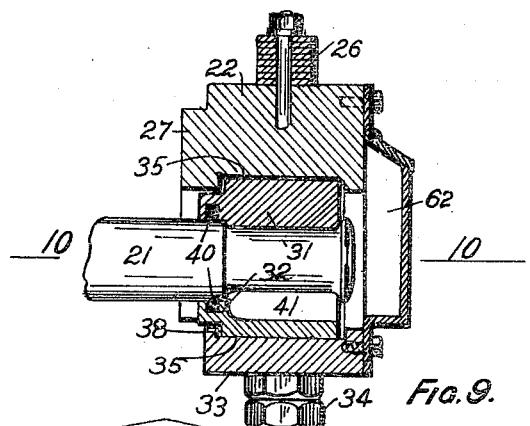
Figure 10:
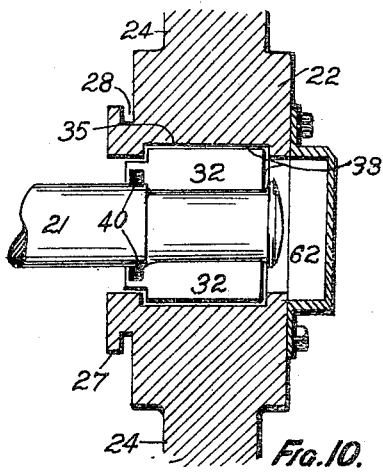
Figure 11:
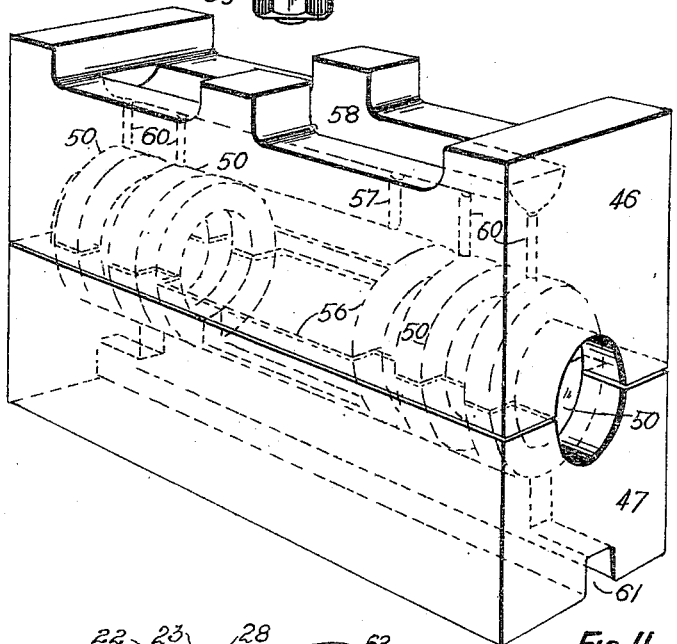
Figure 13:
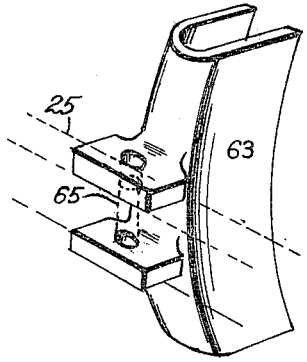
Figure 12:
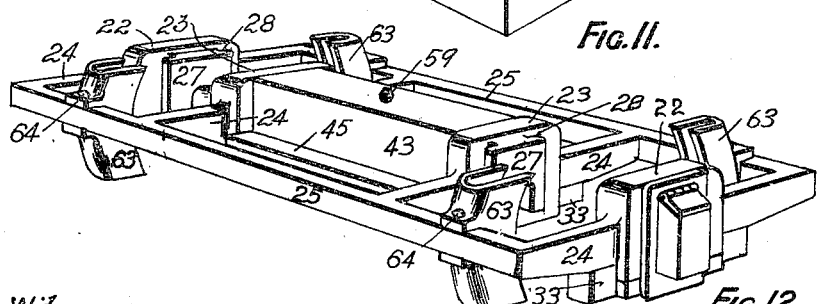

Figure 1 is a perspective view of a bogie having these present improvements embodied therein. Fig. 2 a similar view of a four-wheeled car also embodying these improvements. Fig. 3 is a similar view of the keeps box and part of the connector or frame and Fig. 4 is a longitudinal central sectional elevation thereof. Fig. 5 is a sectional plan—on plane 5—5 Fig. 3. Figs. 6, 7 and 8 are cross sections on lines 6—6, 7—7, 8—8 of Fig. 4 respectively. Fig. 9 is a central sectional elevation through the outside or end bearing and bearing block and Fig. 10 is a sectional plan on line 10—10 of Fig. 9. Fig. 11 is an enlarged perspective view of keeps box bearings hereinafter referred to as "the keeper". Fig. 12 is a perspective view of the connector or rigid frame of a four-wheeled railway car and Fig. 13 is an enlarged perspective view of the axial liner.

Each semi-axle and its wheel are to all intents and purposes one rigid piece rotating as one rigid piece but each semi-axle of a pair of semi-axles is independent one of the other so far as rotation is concerned and each semi-axle may be referred to as an "independent" semi-axle. Each wheel 20 has an independent semi-axle 21 in bearings in bearing blocks 22 and 23 on either side of the wheel. The bearing blocks 22 and 23 are part of or integral with the longitudinal bearers 24 integral with the cross bearers 25 and the whole together with bridge piece 33 form the under axle-frame or rigid connector connecting the four bearings of each pair of semi-axles together which rigid connector or frame supports the body of the car with the intervention of springs 26 or the like. The bearing blocks 22 and 23 have flanges 27 forming races 28 for the horn plates of the rectangular frame 30 to slide therein. Each semi-axle 21 passes between upper part 31 and lower part 32 of a corresponding pair of bearings each of which pair of bearings being placed in a corresponding pair of bearing blocks 22 and 23 respectively and each of these bearings is held in place by a bridge piece 33 secured to the longitudinal bearers 24 by bolts 34. Both the bearing blocks 22 and 23 and the bridge pieces 33 have seats or recesses 35 and 36 respectively in which fit the upper part 31 and lower part 32 respectively of the bearings with space as shown at 38 for end and side play of each bearing. Each upper part 31 and lower part 32 of bearings has an annulus for a felt ring or packing 40 and each lower part 32 of bearing has a recess 41 for a lubricating pad. The inner bearing blocks 23 with the bridge piece 33 have an inwardly projecting rectangular flange 42 to which on studs 44 are bolted the semi-casings 43 which are bolted together through their flanges 45 forming a casing herein termed keeps box. In this keeps box fit the keeps box bearings or keeper having top and bottom blocks 46 and 47 respectively with side and end play allowed by reason of spaces as at 48. The said keeper has circular recesses 50 for the double collars 51 near the inner ends of the semi-axles 21. These semi-axles 21 telescope one another the one end 52 being enlarged and bored to receive the reduced member 54 of the corresponding semi-axle. A removable brass or like metal bush 53 is fast in the female member 52 having a somewhat larger internal diameter than the diameter of male member 54 leaving space as at 55 to enable the male member to have a little play therein while the female member 52 fits and has bearing in the recess 56 in the keeper being lubricated by oil passing through the orifice 57 from the channel 58 charged through the plug hole 59. The channel 58 also supplies a means of conveying lubricant to the collars through the orifices 60. In the lower half of the keeper is a longitudinal slot 61 for a lubricating pad and the same lubricant will pass to the bearings in the bearing blocks 23. The bearing blocks 22 are lubricated by oil from the container or box 62 attached to same. U-shaped shoes 63 (hereinafter termed axial liners) are affixed to cross bearers 25 by bolts 64 passing through an orifice 65 in said bearer 25 which axial liners 63 extend along the sides of the wheels 20 to a depth of about the depth or thickness of the tread of the wheels 20 the extension sides or pieces of said "axial liners" 63 are placed preferably about one eighth of an inch from the corresponding sides of the wheels respectively as shown in Figs. 1 and 2.

It will be seen that the spaces 38 surrounding the upper part 31 and lower part 32 of bearings in the inner and outer bearings blocks 22 and 23 as well as the spaces 48 surrounding the keeper 47 in keeps box 43 and also the space 55 allow of radial action of the semi-axles 21 to take place when rounding curves.

The brake bar 67 connects the brake shoes 66 which brake shoes 66 may be affixed to the cross bearers 25 as shown in Fig. 2.

The first of the said factors of safety for preserving the axial line consists of the use of an upper part 31 and a lower part 32 of the bearings placed on each pair of semi-axles which bearings are positioned within their respective bearing blocks 22 and 23 and bridge pieces 33 so as to restrain movement of the semi-axles 21 up or down a vertical plane while permitting slight movement of said bearings and semi-axles on a horizontal plane. The said bearings thus seek to restrain each pair of semi-axles from departing up or down a vertical plane from the axial line till the said bearings are sufficiently worn to permit the top half 46 and bottom half 47 respectively of the keeper to seek to restrain further departure of each pair of semi-axles up or down a vertical plane from the said axial line the top of the top half 46 of the keeper being preferably distant about one thirty second part of an inch from the inner surface of the top plate 43 of the keeps box. The top part 46 of the keepers sets or rests on the semi-axles as shown in Fig. 4 but is adapted for sliding contact with the inner surface of the top plate 43 of the keeps box when the bearings are sufficiently worn to permit the semi-axles to press the top part 46 of the keeper (adapted as shown in Fig. 11) in contact with the inner surface of the top plate 43 of the keeps box. The bottom part of the bottom half 47 of the keeper is in close contact with the inner surface of the bottom plate of the keeps-box but the top part of the bottom half 47 of the keeper instead of being in close contact with the semi-axles and collars is preferably distant therefrom about one thirty second part of an inch. This construction permits the said bearings constituting the first factor of safety to wear a little allowing the semi-axles to depart correspondingly a little from the axial line when the said keeper constituting the second factor of safety for preserving the axial line then seeks to restrain each pair of semi-axles from further departure up or down a vertical plane from the axial line.

The third factor of safety consists of the application of the axial liners preferably aided by the restraint of the male member 54 within the female member 52 for retaining the axial line. The length of the female member 52 is preferably slightly more than twice the diameter of the semi-axle so that if the diameter of the semi-axle is four inches the length of female member 52 will be about eight inches. The diameter of the bush 53 in the female member 52 preferably gradually increases from the outer extremity toward the inner extremity of the female member 52. The diameter of the bush 53 in the female member 52 being preferably adapted so that when the said bearings and keeper are sufficiently worn to allow the semi-axles to depart from the axial line till the sides of the treads of the wheels are in contact with and rub on the axial lines 63 the male member 54 is in contact with and has correspondingly a bearing surface within the bush 53 in the female member 52 and the male member 54 seeks with the aid of the female member 52 to assist the axial lines 63 in preventing the semi-axles from further departure up or down a vertical plane from the axial line and so tends to prevent the wheels of the car from departing too far from their normal angle to the permanent way.

The first factor of safety for preserving the gage of the wheels consists of the use of collars 51 on the semi-axles 21 which collars 51 are held by the top part 46 and further tendency to alter gage of wheels is restrained by the bottom part 47 of the keeper. The male member 54 preferably extends to within about one sixteenth of an inch from the inner extremity of the bush 53 fast in the female member 52 so that upon the collars 51 wearing the said keeper sufficiently to allow a pair of semi-axles to approach one sixteenth of an inch nearer one another then the inner extremity or end of the male member 54 being in contact with the inner extremity or end of the bush 53 fast in the female member 52 seeks to restrain further lessening of the gage of the wheels.

The use of the male and female members and collars of semi-axles and keeper above mentioned constitute the second factor of safety for preserving the gage of the wheels.

The third factor of safety consists in the use of the axial liner for seeking to prevent the further lessening of the gage of the wheels when the collars on the semi-axles have worn the part of the keeper with which they are in contact sufficiently to allow the inner extremity or end of the male member of a semi-axle to wear away the inner extremity of the bush fast in the female member of a corresponding semi-axle sufficiently to permit contact between the sides of the tread of a wheel and its axial liners.

The above mentioned arrangement of an upper part 46 of the keeper resting on the semi-axles 21 and holding the collars 51 on the semi-axles 21 for preserving the gage of wheels and also the use of the lower part 47 of the keeper assisting to prevent by means of the collars 51 on the semi-axles 21 the lessening of the gage of the wheels seeks also to confine to the semi-axles the lateral thrusts imparted by the wheels to the semi-axles.

The rigid connector framework or frame for each pair of wheels consists of four longitudinal bearers 24 integral with four bearing blocks that is to say two outer bearing blocks 22 and two inner bearing blocks 23. The said longitudinal bearers 24 are integral with two cross bearers 25 and the bridge pieces 33 are bolted or otherwise rigidly joined to and complete the frame which rigid frame is illustrated in Fig. 2 of the drawings. It is essential that the rigid frame as whole be in effect one rigid piece. In the case of a bogie car Fig. 1 the longitudinal bearers 24 for one pair of wheels are joined on to or are continuous with the longitudinal bearers of the frame relating to the nearest pair of wheels of the same bogie car. The axial liners 63 are affixed to the cross bearers 25 of the frame and the frame with said axial liners is thus adapted for the purpose of preventing each wheel of a pair of wheels from departing too far from its normal angle to the permanent way.

The construction and arrangement of the rigid frame and axial liners in themselves seek to prevent each pair of semi-axles from departing too far up or down a vertical plane from the axial line and so seek to retain each pair of wheels at their normal angle to the permanent way or nearly so.

Having now particularly described and ascertained the nature of my said invention and in what manner the same is to be performed I declare that what I claim is;—

1. In a railway car construction, in combination, a frame work comprising bearing blocks, bearings positioned within said blocks and adapted to have movement in a horizontal plane with respect thereto, and a divided axle passing through said bearings.

2. In a railway car construction, in combination, a frame work comprising bearing blocks, bearings positioned within said blocks, and a divided axle passing through said bearings, said bearings being adapted to move within said blocks in a direction transverse to the divided axle.

3. In a railway car construction, in combination, a frame work comprising bearing blocks, bearings positioned within said blocks, and a divided axle passing through said bearings, said bearings being adapted to move within said blocks in a direction parallel with the divided axle.

4. In a railway car construction, in combination, a frame work comprising bearing blocks provided with seats, bearings positioned within said seats, and a divided axle passing through said bearings, the length of said bearings being less than the length of said seats whereby movement of said bearings in a horizontal plane transverse to the divided axle is permitted.

5. In a railway car construction, in combination, a frame work comprising bearing blocks provided with seats, bearings positioned within said seats, a divided axle passing through said bearings, the width of said bearings being less than the width of said seats, whereby movement of said bearings in a horizontal plane parallel to the divided axle is permitted.

6. In a railway car construction, in combination, a frame work comprising bearing blocks provided with seats, bearings positioned within said seats, a divided axle passing through said bearings, the length and width of said bearings, being less than the length and width of said seats, whereby said bearings may move in a horizontal plane relatively to said blocks.

7. In a railway car construction, in combination, a frame work comprising bearing blocks, bearings positioned within said blocks and adapted to have movement with respect thereto in a horizontal plane, said bearings being restricted against movement in a vertical plane, and a divided axle passing through said bearings.

8. In a railway car construction, in combination, a rigid frame comprising transverse bars and cross bars, bearing blocks rigidly carried by said frame, bearings within said blocks and adapted to move in a horizontal plane with respect thereto, and a divided axle passing through the said bearings.

9. In a railway car construction, in combination, a frame work, a divided axle, a plurality of bearings supported by said frame for each part of said divided axle, the inner end of one of said parts being provided with a recess, and the inner end of the other of said parts being provided with a portion slidingly engaging said recess when said parts are in their operative positions.

10. In a railway car construction, in combination, a frame work, a divided axle, a wheel associated with each section of said divided axle, two bearing blocks associated with each section, one block being positioned on each side of the wheels, bearings within said blocks and through which said divided axle passes, said bearings being of such dimensions relatively to said bearing blocks that movement of the former relatively to the latter in a horizontal plane is permitted.

11. In a railway car construction, in combination, a rigid frame work provided with recessed bearing blocks, recessed bridge pieces associated therewith, two part bearings operatively associated with said blocks and bridge pieces, the parts being so proportioned that the bearings are permitted to move in a horizontal plane, and a divided axle passing through said bearings.

12. In a railway car construction, in combination, a rigid frame work provided with recessed bearing blocks, recessed bridge pieces associated therewith, removable means holding said bridge pieces in position, two part bearings operatively associated with said blocks and bridge pieces, the parts being so proportioned that the bearings are permitted to move in a horizontal plane, and a divided axle passing through said bearings.

13. In a railway car construction, in combination, a rigid frame work provided with recessed bearing blocks, recessed bridge pieces associated therewith, bearings operatively associated with said blocks and bridge pieces, the parts being so proportioned that the bearings are permitted to move in a horizontal plane, a divided axle passing through said bearings, a casing surrounding the central portion of said divided axle, and blocks within said casing adapted to engage the inner ends of each section of said divided axle.

14. In railway car construction, in combination, a rigid frame work provided with recessed bearing blocks, recessed bridge pieces associated therewith, bearings positioned within said blocks and so proportioned as to have horizontal movement, a divided axle passing through said bearings, a casing surrounding the central portion of said divided axle, collars upon the inner ends of each section of said divided axle, and blocks within said casing provided with portions adapted to engage said collars to take up the lateral thrusts imparted to the wheel.

15. In a railway car construction, in combination, a rigid frame work provided with bearing blocks, bearings positioned within said blocks and movable in a horizontal plane with relation thereto, a divided axle passing through said bearings, the inner end of one section of said divided axle being provided with a cylindrical socket, and the inner end of the other of said sections being provided with a cylindrical portion adapted to extend within said socket, the diameter of said cylindrical portion being less than the diameter of said socket.

16. In a railway car construction, in combination, a frame work, a divided axle supported thereon, a wheel supported upon each section of said divided axle, and means positioned adjacent the sides of the wheels for retaining the divided axle in alined position.

17. In railway car construction, in combination, a frame work, a divided axle supported thereon, a wheel supported upon each section of said divided axle and axial liners associated with said wheels for preventing undue lateral movement thereof.

18. In a railway car construction, in combination, a frame work, a divided axle supported thereon, a wheel supported upon each section of said axle, and U shaped members embracing the wheels adjacent their outer portions for preventing undue lateral movement thereof.

19. In railway car construction, in combination, a rigid frame work comprising four bearing blocks, a bearing associated with each block and horizontally movable with respect thereto, a divided axle passing through said bearings, there being two bearings for each section of said divided axle, a wheel upon each section of said divided axle and positioned between the bearings associated therewith, said bearings associated with each wheel being equidistant therefrom.

20. In railway car construction, in combination, a frame work comprising bearing blocks, bearings positioned within said blocks and adapted to have movement in a horizontal plane with respect thereto, a divided axle passing through said bearings, a wheel supported upon each section of said divided axle, and means positioned adjacent the sides of the wheels for retaining the divided axle in alined position.

21. In railway car construction, in combination, a frame work comprising bearing blocks provided with seats, bearings positioned within said seats, a divided axle passing through said bearings, the length of said bearings being less than the length of said seats whereby movement of said bearings in a horizontal plane transverse to the divided axle is permitted, a wheel supported upon each section of said divided axle and axial liners associated with said wheels for preventing undue lateral movement thereof.

22. In railway car construction, in combination, a rigid frame work provided with recessed bearing blocks, recessed bridge pieces associated therewith, bearings positioned within said blocks and so proportioned as to have horizontal movement, a divided axle passing through said bearings, a casing surrounding the central portion of said divided axle, collars upon the inner ends of each section of said divided axle, blocks within said casing provided with portions adapted to engage said collars to take up the lateral thrusts imparted to the wheel, a wheel supported upon each section of said divided axle and axial liners associated with said wheels for preventing undue lateral movement thereof.

23. In railway car construction, in combination, a rigid frame work provided with recessed bearing blocks, recessed bridge pieces associated therewith, bearings positioned within said blocks and movable in a horizontal plane with relation thereto, a divided axle passing through said bearings the inner end of one section of said divided axle being provided with a cylindrical socket and the inner end of the other of said sections being provided with a cylindrical portion adapted to extend within said socket, a casing surrounding the central portion of said divided axle, collars upon the inner ends of each section of said divided axle, blocks within said casing provided with portions adapted to engage said collars, a wheel supported upon each section of said divided axle and axial liners associated with said wheels for preventing undue lateral movement thereof.

In testimony whereof I have signed my name to this specification in the presence of two subscribing witnesses.

ARTHUR REGINALD ANGUS.

Witnesses:
PERCY NEWELL,
M. J. CANDRICK.